United States Patent
Sakai et al.

(10) Patent No.: US 11,300,800 B2
(45) Date of Patent: Apr. 12, 2022

(54) PSEUDO SPECKLE PATTERN GENERATION DEVICE, PSEUDO SPECKLE PATTERN GENERATION METHOD, OBSERVATION DEVICE, AND OBSERVATION METHOD

(71) Applicant: HAMAMATSU PHOTONICS K.K., Hamamatsu (JP)

(72) Inventors: Hiroto Sakai, Hamamatsu (JP); Taro Ando, Hamamatsu (JP); Haruyoshi Toyoda, Hamamatsu (JP); Yoshiyuki Ohtake, Hamamatsu (JP); Yuu Takiguchi, Hamamatsu (JP); Tomoko Hyodo, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 269 days.

(21) Appl. No.: 16/499,924

(22) PCT Filed: Mar. 26, 2018

(86) PCT No.: PCT/JP2018/012130
§ 371 (c)(1),
(2) Date: Oct. 1, 2019

(87) PCT Pub. No.: WO2018/190111
PCT Pub. Date: Oct. 18, 2018

(65) Prior Publication Data
US 2020/0117018 A1  Apr. 16, 2020

(30) Foreign Application Priority Data
Apr. 10, 2017  (JP) .............................. JP2017-077474

(51) Int. Cl.
*G02B 27/48*  (2006.01)
*G02B 21/06*  (2006.01)

(52) U.S. Cl.
CPC ............. *G02B 27/48* (2013.01); *G02B 21/06* (2013.01)

(58) Field of Classification Search
CPC ................................ G02B 27/48; G02B 21/06
See application file for complete search history.

(56) References Cited

U.S. PATENT DOCUMENTS

2006/0050374 A1*  3/2006  Slinger ................ G03H 1/2294
                                                   359/385

FOREIGN PATENT DOCUMENTS

| CN | 101288105 A | 10/2008 |
| JP | H06-241725 A | 9/1994 |

(Continued)

OTHER PUBLICATIONS

Bromberg, Yaron, et al., "Generating Non-Rayleigh Speckles with Tailored Intensity Statistics," Physical Review Letters 112, 2014, pp. 213904-1-213904-5.

(Continued)

*Primary Examiner* — Georgia Y Epps
*Assistant Examiner* — Don J Williams
(74) *Attorney, Agent, or Firm* — Faegre Drinker Biddle & Reath LLP

(57) ABSTRACT

A pseudo speckle pattern generation apparatus includes a first spatial light modulator, a first lens, a second spatial light modulator, a second lens and the like. The first spatial light modulator has a first intensity modulation distribution based on a pseudo random number pattern, and spatially modulates intensity of light output from a light source and increased in beam diameter by a beam expander. The second spatial light modulator has a second intensity modulation distribution based on a filter function, is provided on a plane where a Fourier transformed pattern is generated by the first lens, and spatially modulates intensity of the light reached through the (Continued)

first lens. The second lens optically Fourier transforms a pattern of the light output from the second spatial light modulator to generate a Fourier transformed pattern as a pseudo speckle pattern.

8 Claims, 11 Drawing Sheets

(56) References Cited

FOREIGN PATENT DOCUMENTS

| | | | |
|---|---|---|---|
| JP | 2002-207202 | A | 7/2002 |
| JP | 2009-511897 | A | 3/2009 |
| JP | 2011-508911 | A | 3/2011 |
| WO | WO-2005/103610 | A1 | 11/2005 |
| WO | WO-2007/043036 | A1 | 4/2007 |
| WO | WO-2009/087358 | A1 | 7/2009 |

OTHER PUBLICATIONS

Mudry, E., et al., "Structured illumination microscopy using unknown speckle patterns," Nature Photonics, vol. 6, 2012, pp. 312-315.
Shvedov, Vladlen G., et al., "Selective trapping of multiple particles by volume speckle field," Optics Express, vol. 18, No. 3, 2010, pp. 3137-3142.
International Preliminary Report on Patentability dated Oct. 24, 2019 for PCT/JP2018/012130.

* cited by examiner

Fig.2

| CORRELATION FUNCTION c(r) | PARAMETER RANGE | FILTER FUNCTION F(k) |
|---|---|---|
| $(r/\eta)^\alpha e^{-r/\xi}$ | $\alpha > -2$ | $\xi\left(\sqrt{\frac{\xi}{\eta}}\right)^\alpha \sqrt{\Gamma(\alpha+2) F\left(\frac{\alpha+2}{2}, \frac{\alpha+3}{2}; 1; -\xi^2 k^2\right)}$ |
| $e^{-r/\xi}$ | - | $\xi(1+\xi^2 k^2)^{-3/4}$ |
| $e^{-r/\xi}/r$ | - | $\sqrt{\xi}(1+\xi^2 k^2)^{-1/4}$ |
| $(r/\eta)^\alpha$ | $-2 < \alpha < -\frac{1}{2}$ | $\left(\frac{\sqrt{2}}{\eta}\right)^\alpha \sqrt{(-\alpha)\Gamma\left(1+\frac{\alpha}{2}\right)/\Gamma\left(1-\frac{\alpha}{2}\right)} \frac{1}{k^{1+\alpha/2}}$ |
| $e^{-r^2/\xi^2}$ | - | $(\xi/\sqrt{2})e^{-\xi^2 k^2/8}$ |
| $(r^2+\xi^2)^\alpha$ | $\alpha < -\frac{1}{4}$ | $\left(\sqrt{2\xi/k}\right)^{\alpha+1}\sqrt{K_{\alpha+1}/\Gamma(-\alpha)}$ |
| $\dfrac{e^{-\sqrt{r^2+\eta^2}/\xi}}{\sqrt{r^2+\eta^2}}$ | - | $\sqrt{\xi}\exp\left(-\frac{\eta}{2\xi}\sqrt{1+k^2\xi^2}\right)(1+\eta^2\xi^2)^{-1/4}$ |

WHERE, $\Gamma(z)$      GAMMA FUNCTION $F(a,b;c;z)$    GAUSS HYPERGEOMETRIC FUNCTION $$F(a,b;c;z) = \frac{\Gamma(c)}{\Gamma(a)\Gamma(b)} \sum_{n=0}^{\infty} \frac{\Gamma(a+n)\Gamma(b+n)}{\Gamma(c+n)} \frac{z^n}{n!}$$

$K_n(z)$      $n$-TH ORDER "MODIFIED BESSEL FUNCTION OF THE SECOND KIND"

Fig.3
(a)
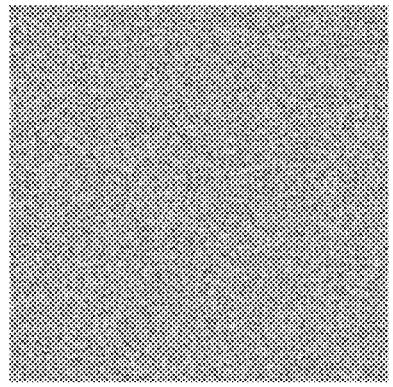
(b)
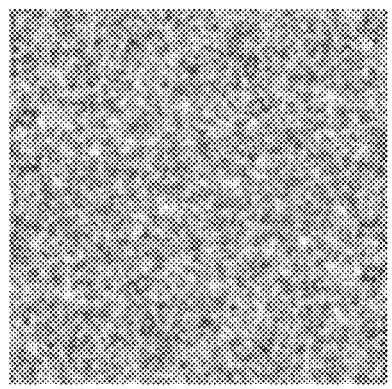

Fig.4
(a)
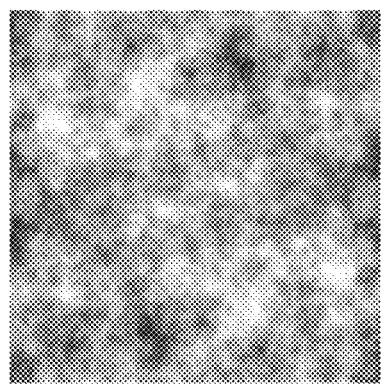
(b)
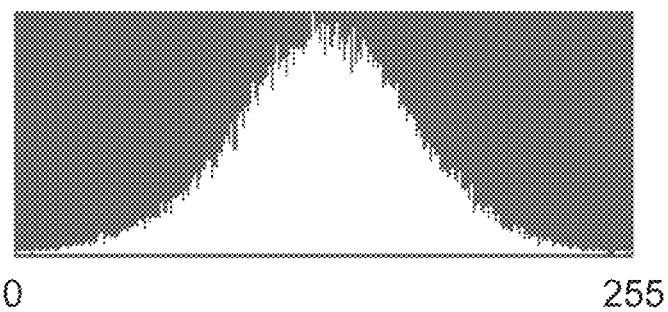

*Fig.5*
(a)
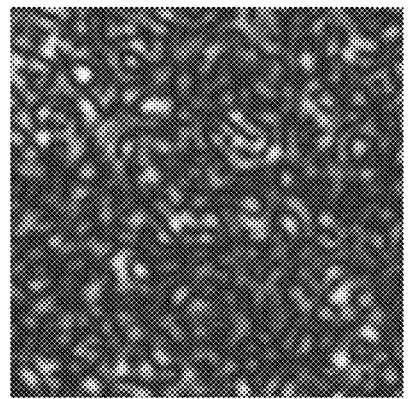
(b)
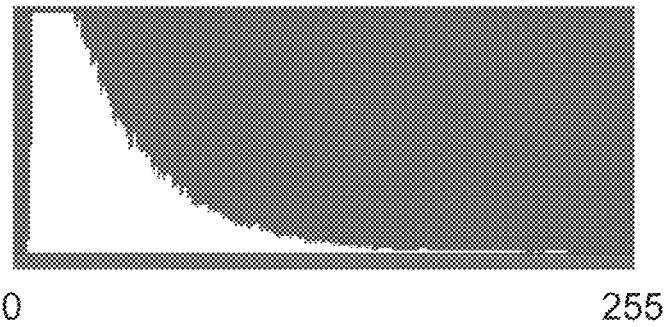

*Fig.6*
(a)
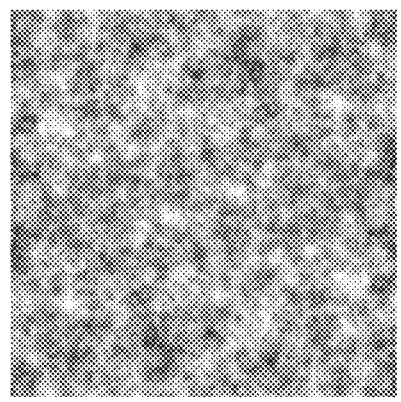
(b)
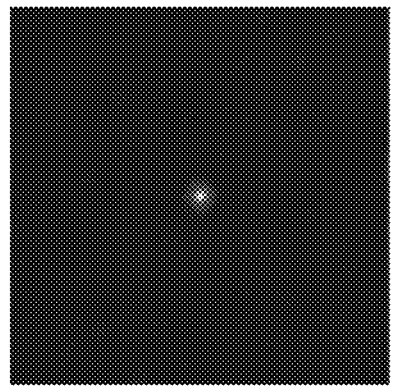

PSEUDO SPECKLE PATTERN GENERATION DEVICE, PSEUDO SPECKLE PATTERN GENERATION METHOD, OBSERVATION DEVICE, AND OBSERVATION METHOD

TECHNICAL FIELD

The present disclosure relates to a pseudo speckle pattern generation apparatus, an observation apparatus including the pseudo speckle pattern generation apparatus, a pseudo speckle pattern generation method, and an observation method including the pseudo speckle pattern generation method.

BACKGROUND ART

When coherent light such as laser light is scattered by a diffuser (scattering medium) such as a diffuser plate, a speckle pattern is generated by interference of the scattered light. A spatial distribution of light intensity in a speckle pattern has a property close to that of a random number pattern, and for this reason, a speckle pattern is used in an interference measurement technique, a super-resolution microscope, an optical measurement technique, and the like, and further, is recently used in an optical manipulation technique such as trapping of an atom and a particle colloid.

A speckle pattern is characterized by a spatial structure and a light intensity statistical distribution. The spatial structure is expressed by a spatial shape of an autocorrelation function of a speckle pattern, and corresponds to a point spread function of an optical system. The light intensity statistical distribution is expressed by a histogram of light intensity in a speckle pattern, and follows an exponential distribution. In addition, a spatial structure (autocorrelation function) of a two-dimensional pseudo random number pattern in which ideal random numbers are arranged two-dimensionally is a delta function.

According to the technique described in Non Patent Document 1, in a configuration including a diffuser and a lens, a speckle pattern is generated on a plane different from a back focal plane of the lens. According to the technique described in Non Patent Document 2, in a configuration including a diffuser and a lens, various speckle patterns are generated by changing the position of the diffuser or replacing the diffuser.

According to the technique described in Non Patent Document 3, a spatial light modulator having a two-dimensional modulation distribution settable by an externally applied signal is used in place of a diffuser, and a speckle pattern is generated by a configuration including the spatial light modulator and a lens. The modulation distribution according to a two-dimensional pseudo random number pattern is set in the spatial light modulator.

CITATION LIST

Non Patent Literature

Non Patent Document 1: Vladlen G. Shvedov et al., "Selective trapping of multiple particles by volume speckle field", OPTICS EXPRESS, Vol. 18, No. 3, pp. 3137-3142 (2010)

Non Patent Document 2: E. Mudry et al., "Structured illumination microscopy using unknown speckle patterns", NATURE PHOTONICS, Vol. 6, pp. 312-315 (2012)

Non Patent Document 3: Yaron Bromberg and Hui Cao, "Generating Non-Rayleigh Speckles with Tailored Intensity Statistics", PHYSICAL REVIEW LETTERS 112, pp. 213904-1-213904-5 (2014)

SUMMARY OF INVENTION

Technical Problem

In the technique described in Non Patent Document 1, only one diffuser is used, which provides no freedom in setting the spatial structure and the light intensity statistical distribution of the speckle pattern to be generated.

In the technique described in Non Patent Document 2, the speckle pattern can be changed by replacing the diffuser. However, in this technique, it is necessary to prepare many diffusers for generation of various speckle patterns, which provides a low degree of freedom in setting the spatial structure and the light intensity statistical distribution of the speckle pattern to be generated. Further, when setting a speckle pattern by changing the diffuser position, it is extremely difficult to reproduce the same pattern.

In the technique described in Non Patent Document 3, the speckle pattern can be changed by changing the modulation distribution presented on the spatial light modulator according to the two-dimensional pseudo random number pattern. However, in this technique, only the contrast of the speckle pattern is adjusted, which provides a low degree of freedom in setting the spatial structure and the light intensity statistical distribution of the speckle pattern to be generated.

An object of embodiments is to provide a pseudo speckle pattern generation apparatus and a pseudo speckle pattern generation method that provide a high degree of freedom in setting a spatial structure or a light intensity statistical distribution of a speckle pattern to be generated and provide high reproducibility of the generated pattern. Further, an object of the embodiments is to provide an observation apparatus including the pseudo speckle pattern generation apparatus, and an observation method including the pseudo speckle pattern generation method.

Here, a pattern generated in the embodiments may have a spatial structure or a light intensity statistical distribution different from that of a normal speckle pattern generated using a diffuser, and thus will be referred to as a "pseudo speckle pattern".

Solution to Problem

An embodiment of the present invention is a pseudo speckle pattern generation apparatus. The pseudo speckle pattern generation apparatus includes (1) a light source for outputting light; (2) a first spatial light modulator having a first intensity modulation distribution based on a pseudo random number pattern, and for spatially performing intensity modulation of the light output from the light source according to the first intensity modulation distribution and outputting modulated light; (3) a first optical system for optically applying Fourier transform to a pattern of the light output from the first spatial light modulator to generate a Fourier transformed pattern; (4) a second spatial light modulator provided on a plane on which the Fourier transformed pattern is generated by the first optical system, having a second intensity modulation distribution based on a filter function, and for spatially preforming intensity modulation of the light reached through the first optical system according to the second intensity modulation distribution and outputting modulated light; (5) a second optical system for optically applying Fourier transform to a pattern of the light output from the second spatial light modulator to generate a Fourier transformed pattern as a pseudo speckle pattern on a light pattern generation plane; and (6) a control unit for setting both or any one of the first intensity modulation distribution of the first spatial light modulator and the second intensity modulation distribution of the second spatial light modulator.

An embodiment of the present invention is an observation apparatus. The observation apparatus includes (1) the pseudo speckle pattern generation apparatus of the above configuration; (2) an observation light source for outputting observation light to be applied to the light pattern generation plane on which the pseudo speckle pattern is generated by the pseudo speckle pattern generation apparatus; and (3) a camera for receiving and imaging light generated by the application of the observation light to the light pattern generation plane.

An embodiment of the present invention is a pseudo speckle pattern generation method. The pseudo speckle pattern generation method includes (1) by a first spatial light modulator having a first intensity modulation distribution based on a pseudo random number pattern, spatially performing intensity modulation of the light output from a light source according to the first intensity modulation distribution and outputting modulated light; (2) by a first optical system, optically applying Fourier transform to a pattern of the light output from the first spatial light modulator to generate a Fourier transformed pattern; (3) by a second spatial light modulator provided on a plane on which the Fourier transformed pattern is generated by the first optical system and having a second intensity modulation distribution based on a filter function, spatially performing intensity modulation of the light reached through the first optical system according to the second intensity modulation distribution and outputting modulated light; (4) by a second optical system, optically applying Fourier transform to a pattern of the light output from the second spatial light modulator to generate a Fourier transformed pattern as a pseudo speckle pattern on a light pattern generation plane; and (5) setting both or any one of the first intensity modulation distribution of the first spatial light modulator and the second intensity modulation distribution of the second spatial light modulator.

An embodiment of the present invention is an observation method. The observation method includes applying observation light output from an observation light source to the light pattern generation plane on which the pseudo speckle pattern is generated by the pseudo speckle pattern generation method of the above configuration; and by a camera, receiving and imaging light generated by the application of the observation light to the light pattern generation plane.

Advantageous Effects of Invention

According to the embodiments, it is possible to provide a high degree of freedom in setting the spatial structure or the light intensity statistical distribution of the generated pseudo speckle pattern, and provide a reproducibility of the generated pattern.

BRIEF DESCRIPTION OF DRAWINGS

FIG. 2 is a table summarizing examples of a correlation function c and a filter function F.

FIG. 3 includes (a) a diagram illustrating an example of a two-dimensional pseudo random number pattern a(x, y) in which a statistical distribution follows a normal distribution, and (b) a diagram illustrating a pseudo speckle pattern b(x, y) obtained by using the two-dimensional pseudo random number pattern a(x, y) of (a) in FIG. 3 and a correlation function c(r)=exp(−r).

FIG. 4 includes (a) a diagram illustrating a pseudo speckle pattern b(x, y) obtained by using the two-dimensional pseudo random number pattern a(x, y) of (a) in FIG. 3 and a correlation function c(r)=exp(−r/9), and (b) a diagram illustrating a light intensity statistical distribution (luminance histogram) of the pseudo speckle pattern b(x, y) of (a) in FIG. 4.

FIG. 5 includes (a) a diagram illustrating an example of a speckle pattern generated by using a diffuser, and (b) a diagram illustrating a light intensity statistical distribution (luminance histogram) of the speckle pattern of (a) in FIG. 5.

FIG. 6 includes (a) a diagram illustrating a pseudo speckle pattern b(x, y) by using the two-dimensional pseudo random number pattern a(x, y) of (a) in FIG. 3 and a correlation function c(r)=exp(−r/3), and (b) a diagram illustrating an autocorrelation image of the pseudo speckle pattern b(x, y) of (a) in FIG. 6.

DESCRIPTION OF EMBODIMENTS

Hereinafter, embodiments of a pseudo speckle pattern generation apparatus, a pseudo speckle pattern generation method, an observation apparatus, and an observation method will be described in detail with reference to the accompanying drawings. In the description of the drawings, the same elements will be denoted with the same reference symbols, and overlapping description will be omitted. The present invention is not limited to these examples.

Figure 1:
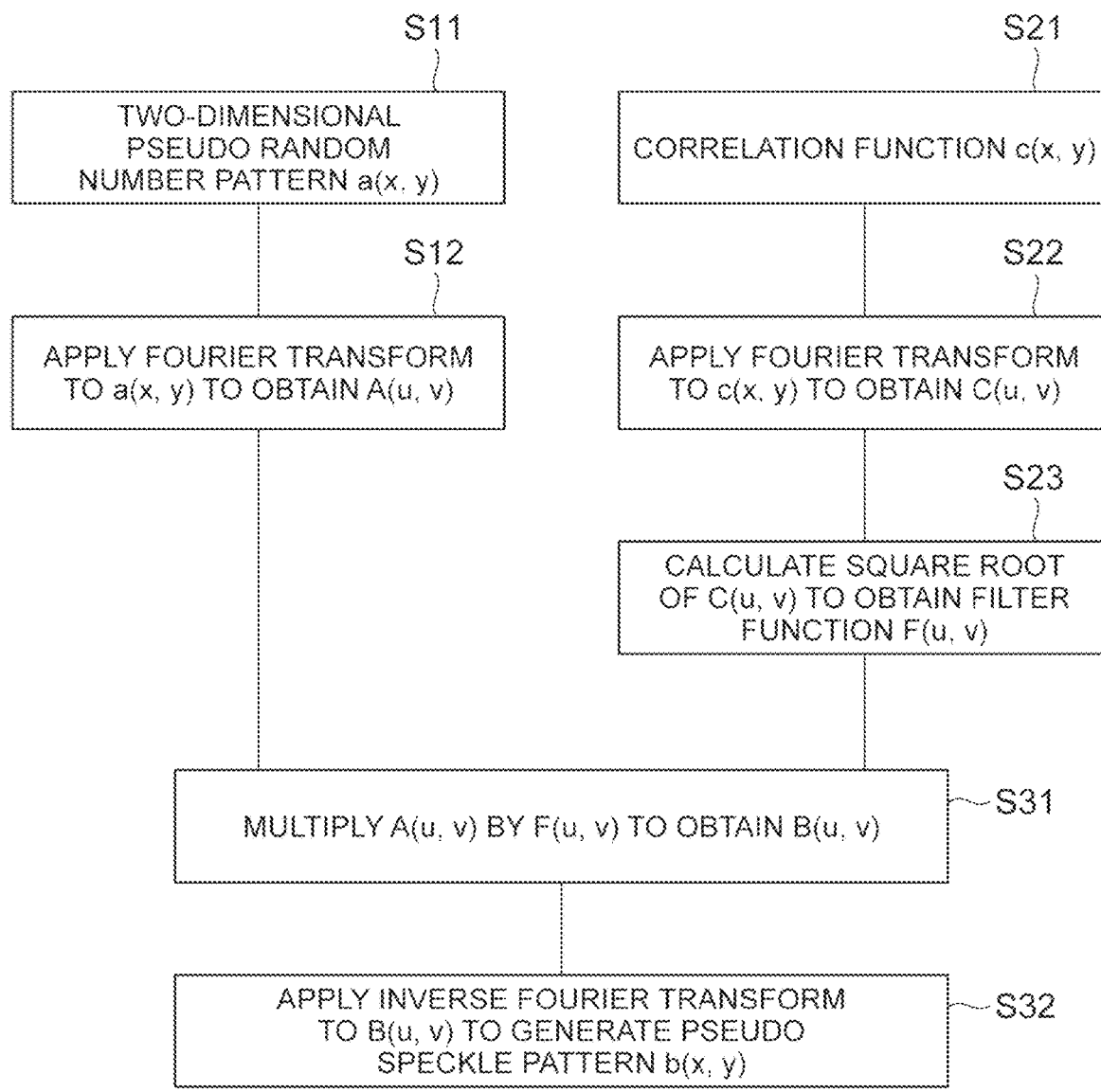
FIG. 1 is a flowchart of a calculation procedure in the case of obtaining a pseudo speckle pattern by calculation.

First, a pseudo speckle pattern generated in the present embodiment will be described. FIG. 1 is a flowchart of a calculation procedure for obtaining a pseudo speckle pattern by calculation. In functions described below, a function represented by a small letter is a function in real space, and a function represented by a capital letter is a function in Fourier space. Further, (x, y) show a position expressed by an orthogonal coordinate system in real space, and (u, v) show a position expressed by an orthogonal coordinate system in Fourier space.

In step S11, a two-dimensional pseudo random number pattern a(x, y) is generated. Specifically, a one-dimensional pseudo random number sequence which follows a predetermined seed number and a statistical distribution is generated by an arbitrary generation method, and these pseudo random numbers are arranged two-dimensionally to generate the two-dimensional pseudo random number pattern a(x, y). When the seed number and the statistical distribution at the time of the generation of the one-dimensional pseudo random number sequence and the arrangement rule at the time of the two-dimensional arrangement are the same, the generation of the two-dimensional pseudo random number pattern a(x, y) has reproducibility. In step S12, a(x, y) is applied with Fourier transform to obtain A(u, v) (formula (1)).

[Formula 1]

$$A(u,v)=FFT[a(x,y)] \quad (1)$$

In step S21, a correlation function c(x, y) is prepared. In step S22, c(x, y) is applied with Fourier transform to obtain C(u, v) (formula (2)). In step S23, a square root of C(u, v) is calculated to obtain a filter function F(u, v) (formula (3)).

[Formula 2]

$$C(u,v)=FFT[c(x,y)] \quad (2)$$

[Formula 3]

$$F(u,v)=\sqrt{C(u,v)} \quad (3)$$

In step S31, A(u, v) is multiplied by F(u, v) to obtain B(u, v) (formula (4)). Then, in step S32, B(u, v) is applied with inverse Fourier transform to obtain a pseudo speckle pattern b(x, y) (formula (5)). Here, Fourier transform and inverse Fourier transform can be performed by similar calculation processing in the case of numerical calculation, and further, can be implemented by similar optical system in the case of an optical system, and thus, there is no need to distinguish between these.

[Formula 4]

$$B(u,v)=A(u,v)\cdot F(u,v) \quad (4)$$

[Formula 5]

$$b(x,y)=IFFT[B(u,v)] \quad (5)$$

The pseudo speckle pattern b(x, y) generated in the above manner has a light intensity statistical distribution according to the statistical distribution of the two-dimensional pseudo random number pattern a(x, y) and a spatial structure (autocorrelation function) according to the correlation function c(x, y) corresponding to the filter function F(u, v). In addition, the filter function F(u, v) is obtained by calculating the square root of C(u, v) in step S23 in order to allow the autocorrelation function of the pseudo speckle pattern b(x, y) and the correlation function c(x, y) to match with each other.

FIG. 2 is a table showing examples of the correlation function c and the filter function F. The correlation function c shown in the table is a function c(r) in which only a distance r from the origin (0, 0) in real space is a variable. The corresponding filter function F is also a function F(k) in which only a distance k from the origin (0, 0) in Fourier space is a variable. In each formula, r and k are non-negative real numbers, and η and ξ are positive real numbers.

As the correlation function c(x, y), a function with which C(u, v) of a result of Fourier transform becomes a function of a non-negative real number is selected, and a function with which a function value is gradually decreased as the distance r becomes larger is preferred. The correlation function c is preferably a function which has only the distance r as a variable. The correlation function c may be a function which has x and y as variables (for example, exp(−|x+y|/ξ)). The correlation function c may have a function value of 1 at the origin (0, 0), and the function value may be an arbitrary value. The correlation function c may be one which cannot be expressed in a mathematical formula.

(a) in FIG. 3 is a diagram illustrating an example of the two-dimensional pseudo random number pattern a(x, y) in which a statistical distribution follows a normal distribution. (b) in FIG. 3 is a diagram illustrating the pseudo speckle pattern b(x, y) obtained by using the two-dimensional pseudo random number pattern a(x, y) of (a) in FIG. 3 and the correlation function c(r)=exp(−r). (a) in FIG. 4 is a diagram illustrating the pseudo speckle pattern b(x, y) obtained by using the two-dimensional pseudo random number pattern a(x, y) of (a) in FIG. 3 and the correlation function c(r)=exp(−r/9). (b) in FIG. 4 is a diagram illustrating a light intensity statistical distribution (luminance histogram) of the pseudo speckle pattern b(x, y) of (a) in FIG. 4.

(a) in FIG. 5 is a diagram illustrating an example of a speckle pattern generated by using a diffuser. (b) in FIG. 5 is a diagram illustrating a light intensity statistical distribution (luminance histogram) of the speckle pattern of (a) in FIG. 5. The light intensity statistical distribution ((b) in FIG. 5) of the speckle pattern generated by using a diffuser can be approximated by an exponential function distribution, while the light intensity statistical distribution ((b) in FIG. 4) of the pseudo speckle pattern b(x, y) can be approximated by a normal distribution, and substantially matches with a statistical distribution of the two-dimensional pseudo random number pattern a(x, y). Here, the horizontal axis of the light intensity statistical distribution (luminance histograms) of (b) in FIG. 4 and (b) in FIG. 5 shows a light intensity in 256 tones.

Figure 7:
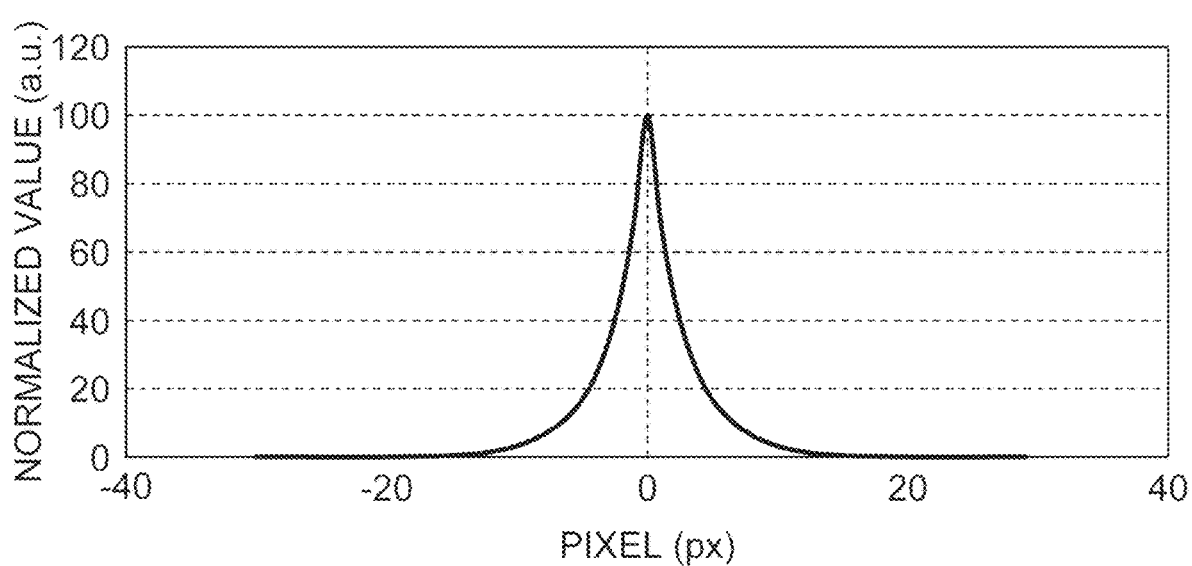
FIG. 7 is a diagram illustrating an intensity profile in the autocorrelation image of (b) in FIG. 6.

(a) in FIG. 6 is a diagram illustrating the pseudo speckle pattern b(x, y) obtained by using the two-dimensional pseudo random number pattern a(x, y) of (a) in FIG. 3 and the correlation function c(r)=exp(−r/3). (b) in FIG. 6 is a diagram illustrating an autocorrelation image of the pseudo speckle pattern b(x, y) of (a) in FIG. 6. FIG. 7 is a diagram illustrating an intensity profile in the autocorrelation image of (b) in FIG. 6. The intensity profiles in an x direction and a y direction substantially match with each other, and also substantially match with the correlation function c(r)=exp(−r/3). That is, the autocorrelation function of the pseudo speckle pattern b(x, y) substantially matches with the correlation function c.

In the pseudo speckle pattern generation apparatus and the pseudo speckle pattern generation method of the present embodiment, a first spatial light modulator having a first intensity modulation distribution based on the two-dimensional pseudo random number pattern a(x, y) and a second spatial light modulator having a second intensity modulation distribution based on the filter function F(u, v) are used to optically generate the pseudo speckle pattern b(x, y).

Figure 8:
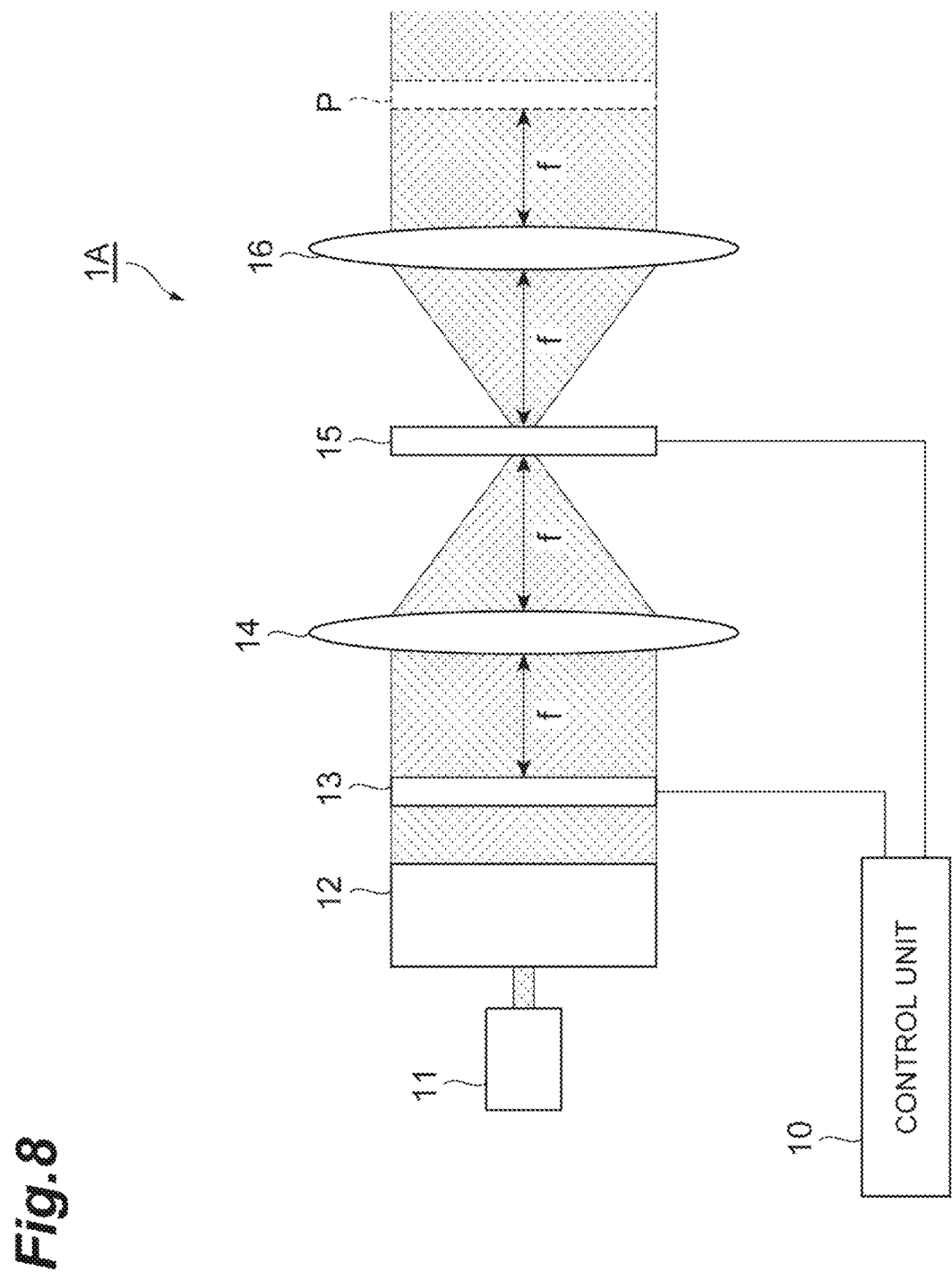
FIG. 8 is a diagram illustrating a configuration of a pseudo speckle pattern generation apparatus 1A of an embodiment.

FIG. 8 is a diagram illustrating a configuration of a pseudo speckle pattern generation apparatus 1A of the present embodiment. The pseudo speckle pattern generation apparatus 1A includes a control unit 10, a light source 11, a beam expander 12, a first spatial light modulator 13, a lens 14, a second spatial light modulator 15, and a lens 16, and generates a pseudo speckle pattern b(x, y) on a light pattern generation plane (image plane) P. The optical system from the first spatial light modulator 13 to the light pattern generation plane P constitutes a 4f imaging optical system.

The light source 11 outputs light. As the light source 11, for example, a laser light source, a lamp light source, a superluminescent diode (SLD) light source or the like is used. The beam expander 12 is optically coupled to the light source 11, and outputs the light output from the light source 11 with increase in the beam diameter. At this time, the light output from the beam expander 12 preferably has an intensity which is uniform in a beam cross section.

The first spatial light modulator 13 is of the intensity modulation type, and has a first intensity modulation distribution based on the two-dimensional pseudo random number pattern a(x, y) generated in step S11. As the first spatial light modulator 13, for example, a modulator with a liquid crystal modulation medium, a digital mirror device (DMD), or a deformable mirror (DM) is used. The first spatial light modulator 13 is optically coupled to the beam expander 12, receives the light output from the light source 11 and increased in beam diameter by the beam expander 12, spatially performs intensity modulation of the received light according to the first intensity modulation distribution, and outputs the modulated light.

The lens 14 is optically coupled to the first spatial light modulator 13 to constitute a first optical system for optically applying Fourier transform to the pattern of the light output from the first spatial light modulator 13. The Fourier transformed pattern generated by the lens 14 corresponds to A(u, v) obtained in step S12.

The second spatial light modulator 15 is of the intensity modulation type, and has a second intensity modulation distribution based on the filter function F(u, v) generated in step S23. As the second spatial light modulator 15, for example, a modulator with a liquid crystal modulation medium, a digital mirror device (DMD), or a deformable mirror (DM) is used. The second spatial light modulator 15 is provided on the plane on which the Fourier transformed pattern is generated by the lens (first optical system) 14, spatially performs intensity modulation of the light reached through the lens 14 according to the second intensity modulation distribution, and outputs the modulated light. The pattern of the light output from the second spatial light modulator 15 corresponds to B(u, v) obtained in step S31.

The lens 16 is optically coupled to the second spatial light modulator 15 to constitute a second optical system for optically applying Fourier transform to the pattern of the light output from the second spatial light modulator 15. The Fourier transformed pattern generated on the light pattern generation plane P by the lens 16 is the pseudo speckle pattern b(x, y) generated in step S32.

The pseudo speckle pattern b(x, y) generated in this manner has a light intensity statistical distribution according to a statistical distribution of the two-dimensional pseudo random number pattern a(x, y) (that is, the first intensity modulation distribution of the first spatial light modulator 13), and has a spatial structure according to the correlation function c(x, y) corresponding to the filter function F(u, v) (that is, the second intensity modulation distribution of the second spatial light modulator 15).

The control unit 10 is electrically coupled to both or any one of the first spatial light modulator 13 and the second spatial light modulator 15, and sets both or any one of the first intensity modulation distribution of the first spatial light modulator 13 and the second intensity modulation distribution of the second spatial light modulator 15. Specifically, the control unit 10 sets, for the first spatial light modulator 13, the first intensity modulation distribution based on the two-dimensional pseudo random number pattern a(x, y) having a statistical distribution according to a light intensity statistical distribution of the pseudo speckle pattern b(x, y) to be generated. Further, the control unit 10 sets, for the second spatial light modulator 15, the second intensity modulation distribution based on the filter function F(u, v) corresponding to the correlation function c(x, y) according to an autocorrelation function of the pseudo speckle pattern b(x, y) to be generated.

The control unit 10 is configured, for example, with a computer, and includes a communication unit which is electrically coupled to both or any one of the first spatial light modulator 13 and the second spatial light modulator 15 and performs communication, and further, an arithmetic unit, a storage unit, an input unit, and a display unit. The arithmetic unit includes a CPU, a DSP, or the like, and performs generation of the two-dimensional pseudo random number pattern a(x, y) and the correlation function c(x, y), Fourier transform, square root calculation, multiplication, autocorrelation function calculation, intensity statistical distribution calculation, and the like.

The storage unit includes, for example, a hard disk, a memory, or the like, and stores generation conditions of the two-dimensional pseudo random number pattern a(x, y) and the correlation function c(x, y), calculation results of respective patterns, and the like. The input unit includes, for example, a keyboard, a pointing device, or the like, and receives input of the above generation condition and the like. The display unit includes, for example, a liquid crystal display, and displays patterns of a(x, y), A(u, v), c(x, y), C(u, v), F(u, v), B(u, v), b(x, y), and the like.

In the present embodiment, two spatial light modulators (the first spatial light modulator 13 and the second spatial light modulator 15) can be used to set both or any one of the first intensity modulation distribution of the first spatial light modulator 13 and the second intensity modulation distribution of the second spatial light modulator 15, thereby providing a high degree of freedom in setting the spatial structure or the light intensity statistical distribution of the generated pseudo speckle pattern b(x, y).

By setting the first intensity modulation distribution for the first spatial light modulator 13 based on the two-dimensional pseudo random number pattern a(x, y) having a statistical distribution according to the light intensity statistical distribution of the pseudo speckle pattern b(x, y) to be generated, it is possible to generate the pseudo speckle pattern b(x, y) having the desired light intensity statistical distribution. Further, by setting the second intensity modulation distribution for the second spatial light modulator 15 based on the filter function F(u, v) which is the square root of Fourier transform of the correlation function c(x, y) according to the autocorrelation function of the pseudo speckle pattern b(x, y) to be generated, it is possible to generate the pseudo speckle pattern b(x, y) having the desired spatial structure.

The pseudo speckle pattern generation apparatus or the pseudo speckle pattern generation method according to the present embodiment can provide a high degree of freedom in setting the spatial structure or the light intensity statistical distribution of the generated pseudo speckle pattern b(x, y). In addition, the control unit 10 can set the spatial structure or the light intensity statistical distribution of the pseudo speckle pattern b(x, y) with high reproducibility and can change the setting quickly.

The pseudo speckle pattern generation apparatus or the pseudo speckle pattern generation method according to the present embodiment can generate the pseudo speckle pattern b(x, y) suitable for the measurement object or the optical manipulation object, and can be favorably used in measurement techniques and optical manipulation techniques effective in various verification methods. Further, the pseudo speckle pattern generation apparatus or the pseudo speckle pattern generation method according to the present embodiment can also generate a bright pseudo speckle pattern having high average luminance when the pseudo speckle pattern is used as structured illumination, and this decreases the number of illuminations and implements high-sensitivity and short-time illumination.

It can be confirmed as described below that the pseudo speckle pattern b(x, y) having the desired spatial structure and light intensity statistical distribution can be generated by the present embodiment. That is, a camera having an imaging plane on the light pattern generation plane P is used to capture an image of the pseudo speckle pattern b(x, y) generated on the light pattern generation plane P. Then, the control unit 10 determines an autocorrelation function of the pseudo speckle pattern b(x, y) obtained by imaging, and compares the function with the correlation function c(x, y). Further, the control unit 10 determines a light intensity statistical distribution of the pseudo speckle pattern b(x, y) obtained by imaging, and compares the distribution with the statistical distribution of the two-dimensional pseudo random number pattern a(x, y).

Figure 9:
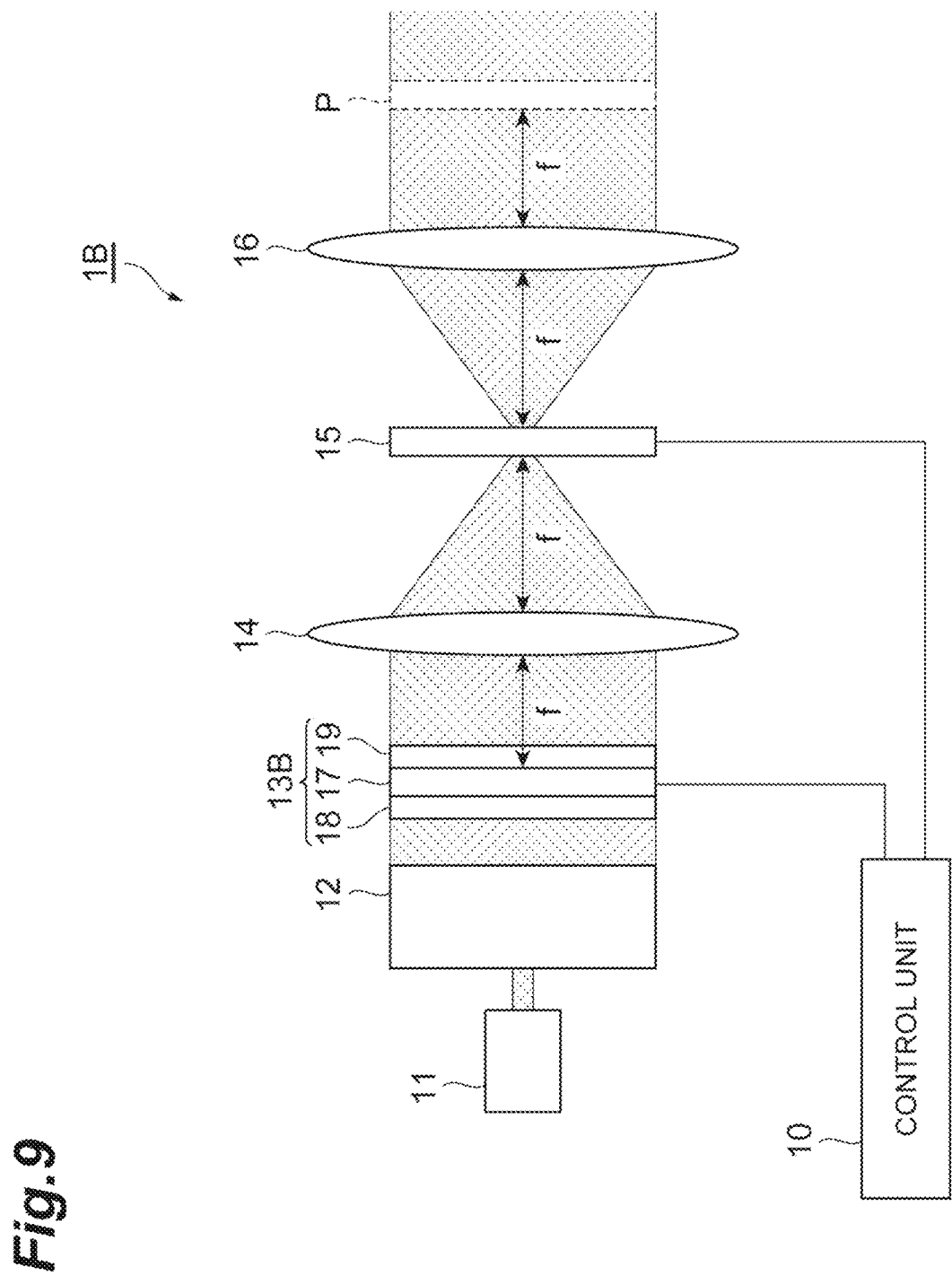
FIG. 9 is a diagram illustrating a configuration of a pseudo speckle pattern generation apparatus 1B of another embodiment.

FIG. 9 is a diagram illustrating a configuration of a pseudo speckle pattern generation apparatus 1B of another embodiment. The pseudo speckle pattern generation apparatus 1B includes a control unit 10, a light source 11, a beam expander 12, a phase modulation type spatial light modulator 17, polarizing plates 18 and 19, a lens 14, a second spatial light modulator 15, and a lens 16, and generates a pseudo speckle pattern b(x, y) on a light pattern generation plane P. The pseudo speckle pattern generation apparatus 1B illustrated in FIG. 9 is different in configuration from the pseudo speckle pattern generation apparatus 1A illustrated in FIG. 8 in including the phase modulation type spatial light modulator 17 and the polarizing plates 18 and 19 in place of the intensity modulation type first spatial light modulator 13. As the phase modulation type spatial light modulator 17, for example, a modulator with a liquid crystal modulation medium is used.

The polarizing plate 18 and the polarizing plate 19 are provided with the phase modulation type spatial light modulator 17 interposed therebetween. In general, the spatial light modulator 17 with the liquid crystal modulation medium has liquid crystal molecules in a specific orientation direction. The polarizing plates 18 and 19 are arranged so as to have a polarization direction at an angle of 45° relative to the orientation direction of the liquid crystal molecules. The polarization directions of the polarizing plates 18 and 19 may be parallel to each other or perpendicular to each other. When being arranged in this manner, the phase modulation type spatial light modulator 17 and the polarizing plates 18 and 19 substantially function as an intensity modulation type first spatial light modulator 13B.

The control unit 10 is electrically coupled to both or any one of the first spatial light modulator 13B (the spatial light modulator 17 constituting the modulator) and the second spatial light modulator 15, and sets both or any one of the first intensity modulation distribution of the first spatial light modulator 13B (the phase modulation distribution of the spatial light modulator 17) and the second intensity modulation distribution of the second spatial light modulator 15.

Similarly, the second spatial light modulator 15 can include two polarizing plates with a phase modulation type spatial light modulator interposed therebetween.

In addition, in each of the pseudo speckle pattern generation apparatuses 1A and 1B, the light pattern generation plane P on which the pseudo speckle pattern b(x, y) is generated may be the back focal plane of the lens (second optical system) 16, or may be a plane different from the back focal plane. For example, setting a pattern in which a Fresnel lens pattern is added to the second intensity modulation distribution for the second spatial light modulator 15 makes it possible to generate the pseudo speckle pattern b(x, y) on the light pattern generation plane P located at a position different from the back focal plane of the lens (second optical system) 16.

Next, an embodiment of an observation apparatus including the pseudo speckle pattern generation apparatus of the present embodiment and an embodiment of an observation method including the pseudo speckle pattern generation method of the present embodiment will be described. According to the observation apparatus or the observation method of the present embodiment, observation light is applied to the light pattern generation plane P on which a pseudo speckle pattern is generated by the pseudo speckle pattern generation apparatus or the pseudo speckle pattern generation method of the present embodiment described above, light generated according to the application of the light to the light pattern generation plane. P (transmitted light, reflected light, scattered light, fluorescence, or the like) is received, and a minute object or the like on the light pattern generation plane P irradiated with the pseudo speckle pattern is imaged.

Figure 10:
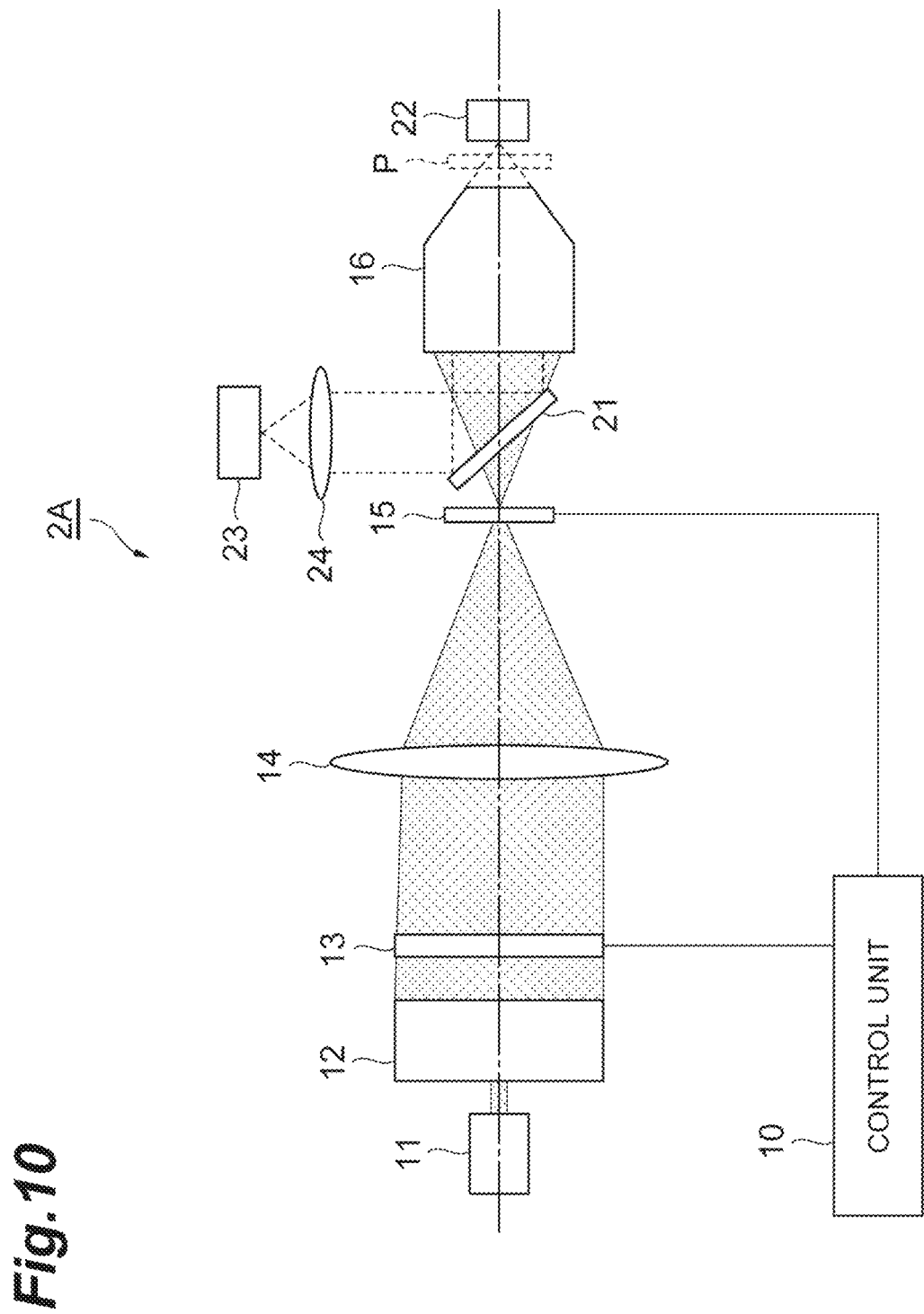
FIG. 10 is a diagram illustrating a configuration of an observation apparatus 2A of an embodiment.

FIG. 10 is a diagram illustrating a configuration of an observation apparatus 2A of the present embodiment. The observation apparatus 2A includes a control unit 10, a light source 11, a beam expander 12, a first spatial light modulator 13, a lens 14, a second spatial light modulator 15, and a lens 16, and generates a pseudo speckle pattern on a light pattern generation plane P. These are similar to the configuration of the pseudo speckle pattern generation apparatus of the present embodiment. An objective lens is used as the lens 16.

In addition to the configuration of the pseudo speckle pattern generation apparatus, the observation apparatus 2A further includes a dichroic mirror 21, an observation light source 22, a camera 23, and a lens 24. The dichroic mirror 21 is provided on an optical path between the second spatial light modulator 15 and the lens 16, transmits the light output from the light source 11, and reflects the light output from the observation light source 22.

The observation light source 22 outputs observation light having a wavelength different from a wavelength of the light output from the light source 11. The observation light source 22 is provided on the side of the light pattern generation plane P opposite to the side where the lens 16 is provided, and applies the observation light to the light pattern generation plane P. The light generated in response to the application of the observation light by the observation light source 22 passes through the lens 16, is reflected by the dichroic mirror 21, passes through the lens 24, and reaches the imaging plane of the camera 23. The lens 16 and the lens 24 form an image of the light generated on the light pattern generation plane P on the imaging plane of the camera 23. The camera 23 captures an image of a minute object or the like on the light pattern generation plane P irradiated with the pseudo speckle pattern. The camera 23 is, for example, a CCD camera or a CMOS camera.

Figure 11:
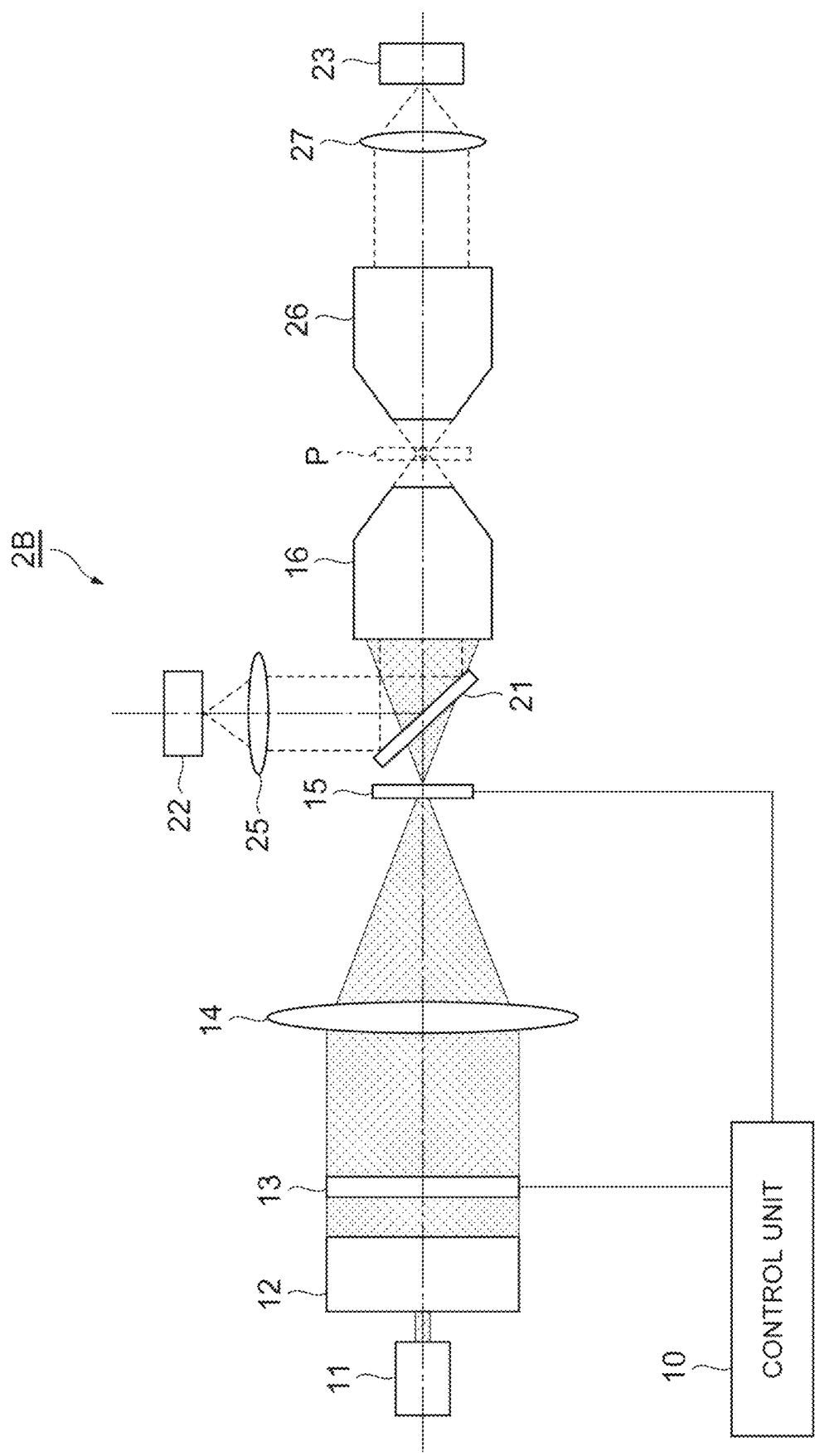
FIG. 11 is a diagram illustrating a configuration of an observation apparatus 2B of another embodiment.

FIG. 11 is a diagram illustrating a configuration of an observation apparatus 2B of another embodiment. The observation apparatus 2B also includes a control unit 10, a light source 11, a beam expander 12, a first spatial light modulator 13, a lens 14, a second spatial light modulator 15, and a lens 16, and generates a pseudo speckle pattern on a light pattern generation plane P. These are similar to the configuration of the pseudo speckle pattern generation apparatus of the present embodiment. An objective lens is used as the lens 16.

In addition to the configuration of the pseudo speckle pattern generation apparatus, the observation apparatus 2B further includes a dichroic mirror 21, an observation light source 22, a camera 23, a lens 25, an objective lens 26, and a lens 27. The dichroic mirror 21 is provided on an optical path between the second spatial light modulator 15 and the lens 16, transmits the light output from the light source 11, and reflects the light output from the observation light source 22.

The observation light source 22 outputs observation light having a wavelength different from a wavelength of the light output from the light source 11. The light output from the observation light source 22 passes through the lens 25, is reflected by the dichroic mirror 21, passes through the lens 16, and is applied to the light pattern generation plane P. The camera 23, the objective lens 26, and the lens 27 are provided on the side of the light pattern generation plane P opposite to the side where the lens 16 is provided. The light generated in response to the application of the observation light by the observation light source 22 passes through the objective lens 26 and the lens 27 and reaches the imaging plane of the camera 23. The objective lens 26 and the lens 27 form an image of the light generated on the light pattern generation plane P on the imaging plane of the camera 23. The camera 23 captures an image of a minute object or the like on the light pattern generation plane P irradiated with the pseudo speckle pattern.

These observation apparatuses 2A and 2B are suitably used as microscopic imaging apparatuses when the pseudo speckle pattern generation apparatus is applied to optical manipulation techniques including optical trapping technique and structured illumination technique or optical imaging technique. According to the observation apparatus or observation method of the present embodiment, a pseudo speckle pattern generated by the pseudo speckle pattern generation apparatus or the pseudo speckle pattern generation method is used for optical manipulation such as trapping or sorting of a minute object, and this enables various types of optical manipulation and observation of the state of the optical manipulation.

In addition, in the above embodiment, the pseudo random number pattern and the pseudo speckle pattern are two-dimensional, however, the pseudo random number pattern and the pseudo speckle pattern may be one-dimensional or three-dimensional.

The pseudo speckle pattern generation apparatus, the pseudo speckle pattern generation method, the observation apparatus, and the observation method are not limited to the embodiments and configuration examples described above, and can be modified in various manners.

The pseudo speckle pattern generation apparatus of the above embodiment is configured to include (1) a light source for outputting light; (2) a first spatial light modulator having a first intensity modulation distribution based on a pseudo random number pattern, and for performing spatial intensity modulation of the light output from the light source according to the first intensity modulation distribution and outputting modulated light; (3) a first optical system for applying optical Fourier transform to a pattern of the light output from the first spatial light modulator to generate a Fourier transformed pattern; (4) a second spatial light modulator provided on a plane on which the Fourier transformed pattern is generated by the first optical system, having a second intensity modulation distribution based on a filter function, and for performing spatial intensity modulation of the light reached through the first optical system according to the second intensity modulation distribution and outputting modulated light; (5) a second optical system for applying optical Fourier transform to a pattern of the light output from the second spatial light modulator to generate a Fourier transformed pattern as a pseudo speckle pattern on a light pattern generation plane; and (6) a control unit for setting both or any one of the first intensity modulation distribution of the first spatial light modulator and the second intensity modulation distribution of the second spatial light modulator.

In the above pseudo speckle pattern generation apparatus, the control unit may be configured to set, for the first spatial light modulator, the first intensity modulation distribution based on the pseudo random number pattern having a statistical distribution according to a light intensity statistical distribution of the pseudo speckle pattern to be generated.

Further, in the above pseudo speckle pattern generation apparatus, the control unit may be configured to set, for the second spatial light modulator, the second intensity modulation distribution based on the filter function being a square root of Fourier transform of a correlation function according to an autocorrelation function of the pseudo speckle pattern to be generated.

The observation apparatus of the above embodiment is configured to include (1) the pseudo speckle pattern generation apparatus of the above configuration; (2) an observation light source for outputting observation light to be applied to the light pattern generation plane on which the pseudo speckle pattern is generated by the pseudo speckle pattern generation apparatus; and (3) a camera for receiving and imaging light generated by the application of the observation light to the light pattern generation plane.

The pseudo speckle pattern generation method of the above embodiment is configured to include (1) by a first spatial light modulator having a first intensity modulation distribution based on a pseudo random number pattern, performing spatial intensity modulation of the light output from a light source according to the first intensity modulation distribution and outputting modulated light; (2) by a first optical system, applying optical Fourier transform to a pattern of the light output from the first spatial light modulator to generate a Fourier transformed pattern; (3) by a second spatial light modulator provided on a plane on which the Fourier transformed pattern is generated by the first optical system and having a second intensity modulation distribution based on a filter function, performing spatial intensity modulation of the light reached through the first optical system according to the second intensity modulation distribution and outputting modulated light; (4) by a second optical system, applying optical Fourier transform to a pattern of the light output from the second spatial light modulator to generate a Fourier transformed pattern as a pseudo speckle pattern on a light pattern generation plane; and (5) setting both or any one of the first intensity modulation distribution of the first spatial light modulator and the second intensity modulation distribution of the second spatial light modulator.

In the above pseudo speckle pattern generation method, for the first spatial light modulator, the first intensity modulation distribution may be set based on the pseudo random number pattern having a statistical distribution according to a light intensity statistical distribution of the pseudo speckle pattern to be generated.

Further, in the above pseudo speckle pattern generation method, for the second spatial light modulator, the second intensity modulation distribution may be set based on the filter function being a square root of Fourier transform of a correlation function according to an autocorrelation function of the pseudo speckle pattern to be generated.

The observation method of the above embodiment is configured to include applying observation light output from an observation light source to the light pattern generation plane on which the pseudo speckle pattern is generated by the pseudo speckle pattern generation method of the above configuration; and by a camera, receiving and imaging light generated by the application of the observation light to the light pattern generation plane.

INDUSTRIAL APPLICABILITY

The embodiments can be used as a pseudo speckle pattern generation apparatus, a pseudo speckle pattern generation method, an observation apparatus, and an observation method.

REFERENCE SIGNS LIST 1A, 1B—pseudo speckle pattern generation apparatus, 2A, 2B—observation apparatus, 10—control unit, 11—light source, 12—beam expander, 13—first spatial light modulator, 14—lens (first optical system), 15—second spatial light modulator, 16—lens (second optical system), 17—spatial light modulator, 18, 19—polarizing plate, 21—dichroic mirror, 22—observation light source, 23—camera, 24—lens, 25—lens, 26—objective lens, 27—lens, P—light pattern generation plane.

The invention claimed is:

1. A pseudo speckle pattern generation apparatus comprising:
a light source configured to output light;
a first spatial light modulator having a first intensity modulation distribution based on a pseudo random number pattern and being settable by an externally applied signal, and configured to spatially perform intensity modulation of the light output from the light source according to the first intensity modulation distribution and output modulated light;
a first optical system configured to optically apply Fourier transform to a pattern of the light output from the first spatial light modulator to generate a Fourier transformed pattern;
a second spatial light modulator provided on a plane on which the Fourier transformed pattern is generated by the first optical system, having a second intensity modulation distribution based on a filter function and being settable by an externally applied signal, and configured to spatially perform intensity modulation of the light reached through the first optical system according to the second intensity modulation distribution and output modulated light;
a second optical system configured to optically apply Fourier transform to a pattern of the light output from the second spatial light modulator to optically generate a Fourier transformed pattern as a pseudo speckle pattern on a light pattern generation plane; and
a controller configured to prepare the first intensity modulation distribution based on the pseudo random number pattern and the second intensity modulation distribution based on the filter function for optically generating the pseudo speckle pattern, and set both of the first intensity modulation distribution of the first spatial light modulator and the second intensity modulation distribution of the second spatial light modulator.

2. The pseudo speckle pattern generation apparatus according to claim 1, wherein the controller is configured to set, for the first spatial light modulator, the first intensity modulation distribution based on the pseudo random number pattern having a statistical distribution according to a light intensity statistical distribution of the pseudo speckle pattern to be generated.

3. The pseudo speckle pattern generation apparatus according to claim 1, wherein the controller is configured to set, for the second spatial light modulator, the second intensity modulation distribution based on the filter function being a square root of Fourier transform of a correlation function according to an autocorrelation function of the pseudo speckle pattern to be generated.

4. An observation apparatus comprising:
the pseudo speckle pattern generation apparatus according to claim 1;
an observation light source configured to output observation light to be applied to the light pattern generation plane on which the pseudo speckle pattern is generated by the pseudo speckle pattern generation apparatus; and
a camera configured to receive and image light generated by the application of the observation light to the light pattern generation plane.

5. A pseudo speckle pattern generation method comprising:
by a first spatial light modulator having a first intensity modulation distribution based on a pseudo random number pattern and being settable by an externally applied signal, spatially performing intensity modulation of the light output from a light source according to the first intensity modulation distribution and outputting modulated light;
by a first optical system, optically applying Fourier transform to a pattern of the light output from the first spatial light modulator to generate a Fourier transformed pattern;
by a second spatial light modulator provided on a plane on which the Fourier transformed pattern is generated by the first optical system and having a second intensity modulation distribution based on a filter function and being settable by an externally applied signal, spatially performing intensity modulation of the light reached through the first optical system according to the second intensity modulation distribution and outputting modulated light;
by a second optical system, optically applying Fourier transform to a pattern of the light output from the second spatial light modulator to optically generate a Fourier transformed pattern as a pseudo speckle pattern on a light pattern generation plane;
preparing the first intensity modulation distribution based on the pseudo random number pattern and the second intensity modulation distribution based on the filter function for optically generating the pseudo speckle pattern; and
setting both of the first intensity modulation distribution of the first spatial light modulator and the second intensity modulation distribution of the second spatial light modulator.

6. The pseudo speckle pattern generation method according to claim 5, comprising setting, for the first spatial light modulator, the first intensity modulation distribution based on the pseudo random number pattern having a statistical distribution according to a light intensity statistical distribution of the pseudo speckle pattern to be generated.

7. The pseudo speckle pattern generation method according to claim 5, comprising setting, for the second spatial light modulator, the second intensity modulation distribution based on the filter function being a square root of Fourier transform of a correlation function according to an autocorrelation function of the pseudo speckle pattern to be generated.

8. An observation method comprising:
applying observation light output from an observation light source to the light pattern generation plane on which the pseudo speckle pattern is generated by the pseudo speckle pattern generation method according to claim 5; and
by a camera, receiving and imaging light generated by the application of the observation light to the light pattern generation plane.

\* \* \* \* \*